US008931530B2

(12) United States Patent
Sugarman

(10) Patent No.: US 8,931,530 B2
(45) **Date of Patent: *Jan. 13, 2015**

(54) INTERACTIVE BOARD COVER

(75) Inventor: Rob Sugarman, Huntington Station, NY (US)

(73) Assignee: Tequipiment, Inc., Huntington Station, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/361,784

(22) Filed: Jan. 30, 2012

(65) Prior Publication Data

US 2012/0199257 A1 Aug. 9, 2012

Related U.S. Application Data

(63) Continuation of application No. 12/267,415, filed on Nov. 7, 2008, now Pat. No. 8,132,602.

(60) Provisional application No. 60/986,067, filed on Nov. 7, 2007.

(51) Int. Cl.

| | |
|---|---|
| *B32B 1/04* | (2006.01) |
| *B43L 1/00* | (2006.01) |
| *B43L 1/04* | (2006.01) |
| *G09F 15/00* | (2006.01) |

(52) U.S. Cl.

CPC ... *B43L 1/00* (2013.01); *B43L 1/04* (2013.01); *G09F 15/0056* (2013.01)

USPC .............................................. 150/165; 428/99

(58) Field of Classification Search

CPC ................................ B43L 1/00; G09F 15/0056

USPC ............................. 428/99; 150/165, 154, 158

See application file for complete search history.

(56) References Cited

U.S. PATENT DOCUMENTS 5,849,390 A 12/1998 Dillon
5,922,437 A 7/1999 Bryant

*Primary Examiner* — Alexander Thomas

(74) *Attorney, Agent, or Firm* — Rutan & Tucker LLP; Hani Z. Sayed

(57) ABSTRACT

An improved interactive learning board cover is provided. The improved interactive learning board cover may provide protection to the learning board, whereby the cover may stretch over the entire surface of a whiteboard and may be secured at each of the four corners of the board with a sewn pocket thereby allowing securement of the board without the need for additional handles, straps and/or padding.

10 Claims, 3 Drawing Sheets

INTERACTIVE BOARD COVER

CROSS REFERENCE TO RELATED APPLICATION

This document is a continuation patent application, claiming the benefit of, and priority of U.S. patent application Ser. No. 12/267,415 filed on Nov. 7, 2008, now issued as U.S. Pat. No. 8,132,602 on Mar. 13, 2012 and claiming the benefit of, and priority to U.S. Provisional Application No. 60/986,067 filed on Nov. 7, 2007, all of which are incorporated herein by reference in their entirety for all purposes.

FIELD OF THE INVENTION

The field of the invention is for a device for an interactive learning board. More specifically, the field of the invention is for an adaptable cover for an interactive learning board.

BACKGROUND

There are many different educational tools that are utilized by teaching professionals to illustrate and allow for easier understanding and development of learning for a student. Chalkboards have been used for decades to illustrate visual characteristics to a student to help them visualize and understand information presented by an instructor. The chalkboard required a piece of chalk of light color against a chalkboard of darker color to illustrate some written information to the student. The problem with the chalkboard was that chalk was sometimes to light or did not properly illustrate correctly to the student. Additionally, chalk is dirty and caused secondary particulate when used. Additionally, chalkboards are typically very dark in color to contrast the chalk being used and therefore were typically difficult to see.

A whiteboard, or dry-erase board was subsequently developed and is one of these common writing devices used in educational environments to illustrate and help educate students using visual ques. Most of these dry-erase boards have a glossy surface, most commonly colored white, where markings can be made. Whiteboards operate analogously to chalkboards in that they allow markings to temporarily adhere to the surface of the board. These markings are removed more easily than if one were to use a chalkboard. Whiteboards have become very popular in offices, meeting rooms and particularly classroom settings.

However, unlike chalkboards and the need for chalk to make markings on the board, the dry-erase board allows for the use of easier erasable marker to be utilized to make marks on the board. This use of an erasable, non-permanent marker allows the user to make frequent changes and alterations to the written form without the hassle of chalky residue normally accompanying chalkboards. Whiteboards are normally constructed using different materials including porcelain enameled steel and standard melamin.

However, one common problem with prior art whiteboards, is that there are essentially only two types. The permanently affixed whiteboard that acts as a replacement to the chalkboard, but is limited to only that functionality, and cannot be utilized for any other function. Additionally, a portable whiteboard having a plurality of feet may be utilized whereby the whiteboard may be replaced and moved to new locations as needed by the user. This type of whiteboard would require a smaller board, as it would be difficult to move an entire large whiteboard structure. Additionally, another problem with this removable whiteboard is that they are cumbersome to set up and remove when not being utilized. Additionally, even if the whiteboard is movable from one location to another, they are typically very difficult to keep clean because of their inherent color: white. It is easy to build up dust and other residue on the whiteboard requiring it to be frequently cleaned. Additionally, when moved from one location to another, it is common for the board to get bumped, scratched and/or otherwise damaged during transit.

Therefore, a need exists for an improved whiteboard and/or chalkboard covering apparatus. Additionally, a need exists for an improved interactive learning device cover that protects the apparatus against scratching, bumping and other damages during transit from one location to another.

SUMMARY OF THE INVENTION

The present invention provides an improved interactive learning board cover. Additionally, the present invention may provide a cover that stretches over the entire surface of a whiteboard and may be secured at each of the four corners of the board with a sewn pocket thereby allowing securement of the board without the need for additional handles, straps and/or padding.

To this end, in a exemplary embodiment of the present invention, a device to attach to an interactive learning board. The device has a cover having a first side and a second side whereby the second side is adapted to contact the outside edge of the interactive learning board. The device is a plurality of sewn elasticized edges on the cover contoured to embrace a plurality of edges of the interactive learning board.

In an exemplary embodiment, the device has a first side of the cover may be constructed of a material differing from the material of the second side of the cover.

In an exemplary embodiment, the device has a plurality of pockets located on the first side of the cover apparatus.

In an exemplary embodiment, the device has a plurality of pockets adapted to be removably connected to the first side of the cover.

In an exemplary embodiment, wherein the said device is constructed of fabric.

In an exemplary embodiment, the device is constructed of any suitable material which may protect the outside edges and front portion of the interactive learning board.

In an exemplary embodiment, the interactive learning board is a whiteboard.

In an exemplary embodiment, the device envelops the corners of the interactive learning board and further wherein the sewn elasticized edges are adapted to wrap around the corners of the learning board and to elastically tighten about the corners.

In an exemplary embodiment, the device is adapted for fitment around a plurality of differently sized interactive learning boards.

In an exemplary embodiment, the device does not utilize handles or straps to secure and protect the interactive learning board from scratches or damage during transport.

Among the many different possibilities contemplated, the device may allow for covering of a wall mounting interactive learning board.

Additionally, in an exemplary embodiment, the device may be configured to accommodate a plurality of different shapes and sizes of interactive learning boards.

In another exemplary embodiment, it is contemplated that the device may be configurable to cover a whiteboard.

In yet another exemplary embodiment, it is contemplated that the device may be configured to cover a blackboard.

Still a further exemplary embodiment contemplates where the device may be constructed of fabric.

In another exemplary embodiment, it is contemplated that the device may be constructed of polyurethane.

In a further exemplary embodiment, it is contemplated that the device may have at least one securement section whereby the securement section is adapted to wrap around the outside edge of the interactive learning board.

A further exemplary embodiment contemplates that the device may be constructed of a suitable material that will properly protect the interactive learning board.

In another exemplary embodiment, it is contemplated that the device may be secured to portable learning boards.

Further, a contemplated embodiment of the device may be adapted to have padding on the interior portion of the device which is in direct contact with the learning board.

Additionally, in an exemplary embodiment, the device may be adapted to have at least one sewn pocket.

In yet another exemplary embodiment, it is contemplated that the device may have a plurality of sewn pockets whereby the sewn pockets are adapted to envelop and/or encircle the outside edge of the interactive learning device.

A further exemplary embodiment of the present invention may include a device whereby the device may have an elastic portion whereby the elastic portion define the sewn pockets.

Still, another exemplary embodiment of the present invention may include a device that may allow for easier placement on a whiteboard and safer transport of same.

A further exemplary embodiment of the present invention may include a device, whereby the device is pleated on its outside portions to surround the outside edges of the interactive learning apparatus.

In yet another exemplary embodiment of the present invention, a device is provided to cover a whiteboard whereby the device does not utilize handles, traps or padding.

Yet another exemplary embodiment of the present invention may include a device whereby the device may be constructed of neoprene fabric.

In yet another exemplary embodiment of the present invention, a device is provided whereby the device does not require significant tools to assemble, and/or utilize, and may be easily utilized and removed from the interactive learning device when desired.

Various objects, features, aspects and advantages of the present invention will become more apparent from the following detailed description of preferred embodiments of the invention, along with the accompanying drawings in which like numerals represent like components.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Although embodiments of the invention may be described and illustrated herein in terms of whiteboards, and particularly smart boards, it should be understood that embodiments of this invention are not so limited, but are additionally applicable to any support system. For example, features of the present invention may be used with chalk boards or bulletin boards. Furthermore, although embodiments of the invention may be described and illustrated herein in terms of educational tools, including whiteboards, it should be understood that embodiments of the invention are also applicable to other industries, such as electronic controls and displays, including audio/video equipment mounting systems.

Figure 1:
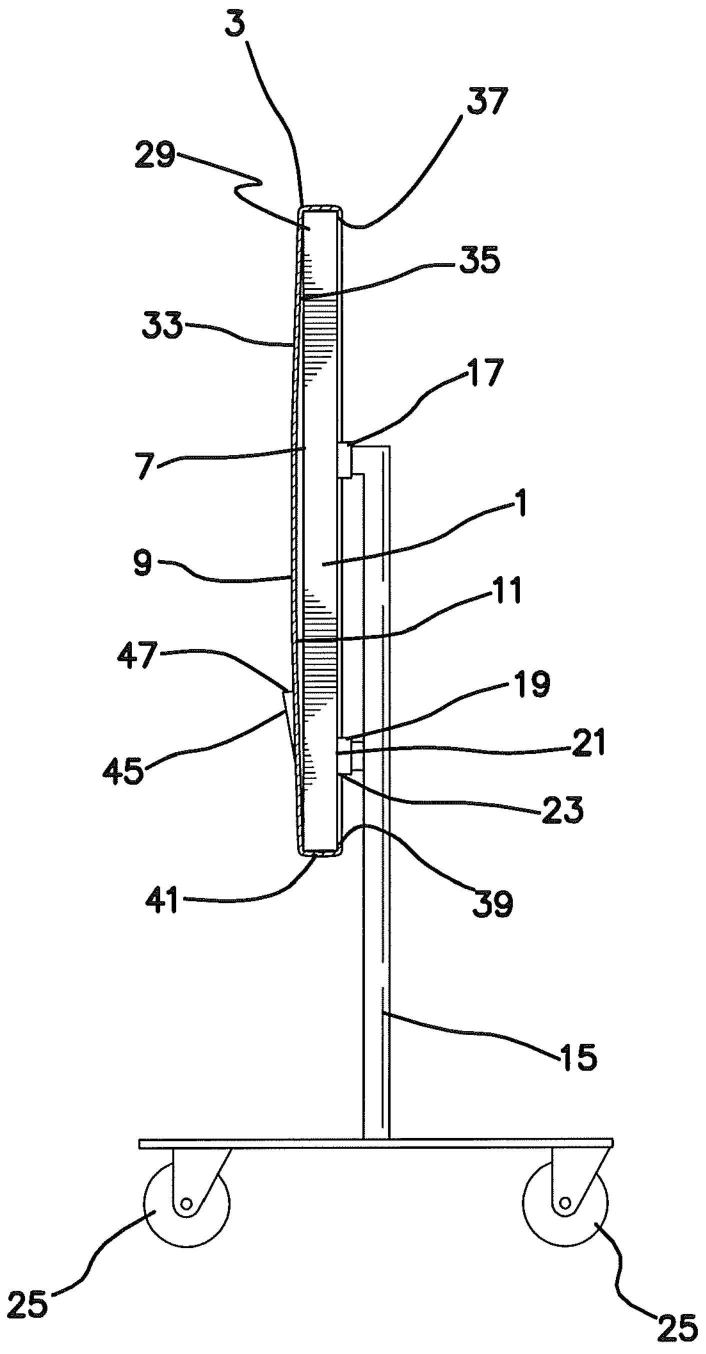
FIG. 1 is a side view of the invention illustrating the apparatus in an exemplary embodiment of the present invention.

FIG. 1 illustrates a side view of a white board 1 and a whiteboard cover 3. As previously illustrated, although a whiteboard 1 is disclosed, it should be understood that any type of board may be contemplated whereby the cover 3 may be adapted for fitment around same. As further illustrated in FIG. 1, the whiteboard cover 3 may be adapted to fit about the outside edge 7 of the whiteboard 1. The whiteboard cover 3, in an exemplary embodiment would have at least a first side 9 and a second side 11, the first side 9 representing the outside edge of the whiteboard cover 3, while the second side 11 representing the inside edge of the whiteboard cover 3. As further illustrated in FIG. 1, the whiteboard 1 may be mounted to a surface such as a wall and the like (not shown). However, in an exemplary embodiment, the whiteboard 1 may be mounted to a portable stand 15. The portable stand 15 may have a plurality of attachment portions 17, 19 whereby the whiteboard 1 may be attached to the plurality of attachment portions 17, 19 with an attachment means 21. In an exemplary embodiment, the attachment means 21 may be a screw 23 and/or a plurality of screws, adhesive, hook and fastener, snap fit and the like. The portable stand 15 may be moveable with the aid of wheels 25. The wheels 25 may allow the portable stand 15 and the attached whiteboard 1 to be moved from one location to another when desired by the individual user. Further, it is contemplated that the whiteboard 1 is removably attached to the portable stand 15 for portability of the whiteboard 1 separate from the portable stand 15 and/or any surface to which is may be hung.

Figure 2:
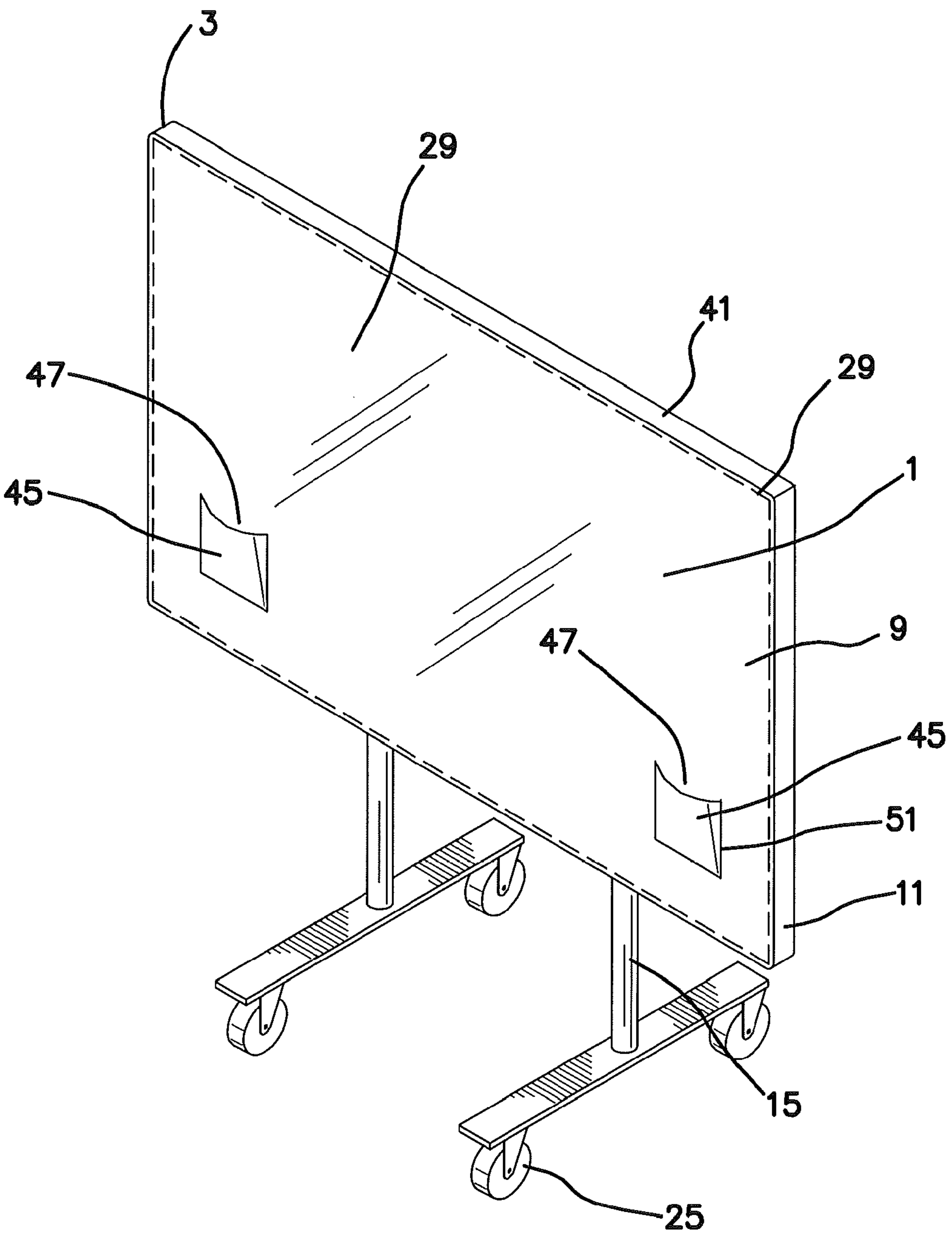
FIG. 2 is front perspective view of the invention in an exemplary embodiment of the present invention.

FIGS. 1 and 2 further illustrate the whiteboard cover 3 which may envelope the outside surface 29 of the whiteboard 1. In a preferred embodiment, the first side 9 and the second side 11 of the whiteboard cover may be constructed of different fabrics, whereby the first side 9 may be constructed of a more durable material that may resist scratching or damaging of the underlying whiteboard 1. In an exemplary embodiment, the second side 11 may be constructed a softer material which may contact at least a portion of the whiteboard 1 and may not cause scratching, bending, dents or any other damaging effects to the outside surface 29 of the whiteboard 1. In an exemplary embodiment, the whiteboard cover 3 may be constructed from a plurality of layers, a first layer 33 which corresponds with the first side 9 of the whiteboard cover 3 and a second layer 35 which corresponds with the second side 11 of the whiteboard cover 3. The first layer 33 and the second layer 35 may be attached to one another at a first end 37 and a second end 39 of the whiteboard cover 3 as illustrated in FIG. 1. The first layer 33 and the second layer 35 may be attached to one another with the use of stitching, hook and loop faster and the like. It is further contemplated that the first layer 33 and the second layer 35 may be detachable from one another such that the space 41 between the first layer 33 and the second layer 35 may be utilized for storage of objects (not shown) or may be utilized to add extra protection for the whiteboard 1. For example, the space 41 may be provided for addition of subsequent material to be placed therein which may absorb any accidental or incidental striking or bumping of the whiteboard 1 when the board is not in use or in storage. For example, if the whiteboard 1 is in storage, and an individual is putting another article in the same room as the whiteboard 1, it is contemplated that while storing additional articles, the whiteboard 1 may be struck by the other article to be stored. If there is not whiteboard cover 3 present, an edge or other portion of the additionally stored article may strike the board and cause damage to the board making it either unusable or less useable. The addition of the whiteboard cover 3 may protect from accidental striking of the board 1. Further, with the addition of material to the space 41 between the first layer 33 and these second layer 35, an additional buffer may be provided to the whiteboard 1 while not in use.

As further illustrated in FIGS. 1 and 2, the first side 9 of the whiteboard cover 3 may also include at least a pocket 45. The pocket 45 may be utilized on the first side 9 for storage of loose articles including whiteboard pens, erasers and the like. The pocket 45 may provide a space 47 therein which can be adapted for storage. A plurality of pockets 45 may be provided as illustrated in FIG. 2. It is contemplated that the pocket 45 is formed on the first side and may in fact attach to the first side 9 whereby the pocket may be removably attached to the first side 9 of the whiteboard cover with an attachment means 51. In an exemplary embodiment, the attachment means 51 is preferably a fastener allowing for pocket 45 to be completely removed from the first side 9 of the whiteboard cover 3. In this case, the pocket is a completely self contained element and may be moved and placed at any position on the whiteboard cover 3. It is further contemplated that the pocket 45 may be integrated into the whiteboard cover 3 such that the pockets 45 or built into the cover 3 and are not movable about the whiteboard cover 3. In this embodiment, the pocket would consist of space 47 which would includes an opening on the first side 9 of the cover and whereby the pocket 45 may recess into the space 41 contained between the first layer 33 and the second layer 35 of the whiteboard cover 3.

Figure 3:
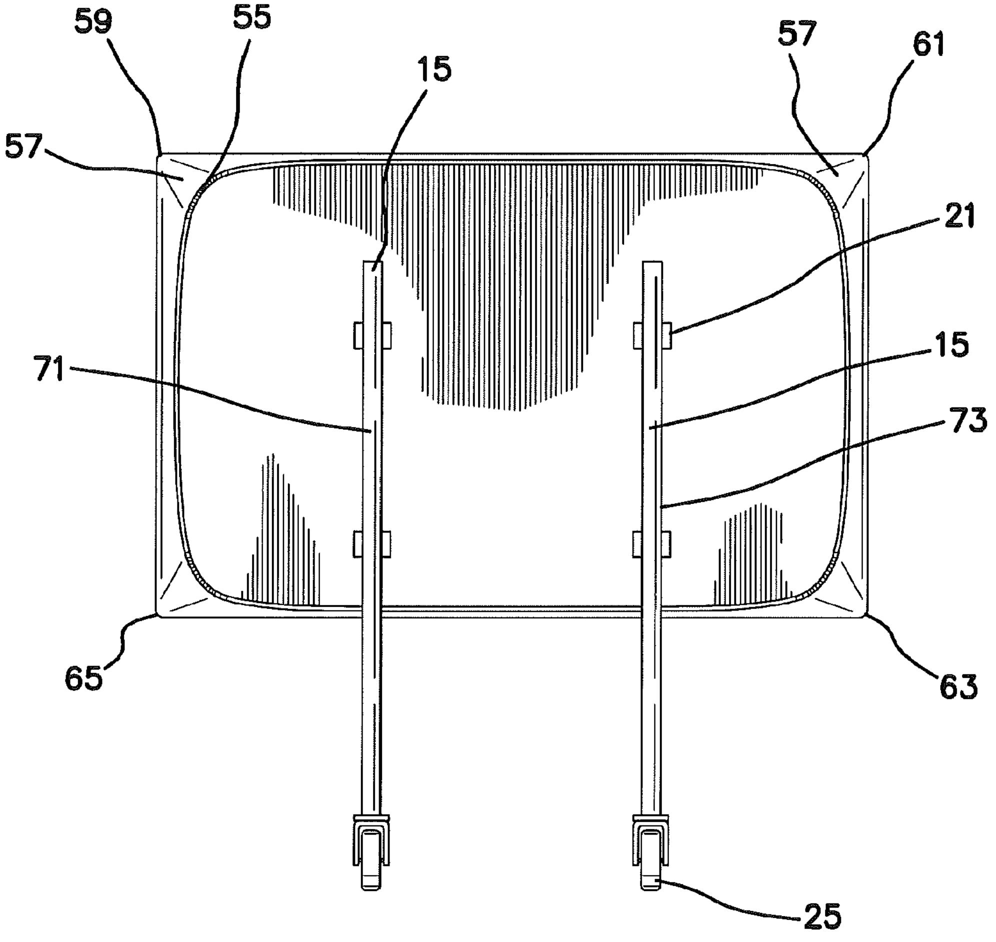
FIG. 3 is a back view of the apparatus in an exemplary embodiment of the present invention.

FIG. 3 illustrates a rear view of the whiteboard 1 with the accompanying whiteboard cover 3 attached thereto. As illustrated, the whiteboard cover 3 may allow for enclosure of the whiteboard 1 without the use of straps, hooks, and the like. The whiteboard cover 3 may simply uses and elastic means 55 which includes at least a pocket portion 57 that abuts the outside edges 59, 61, 63 and 65 of the whiteboard 1. Also illustrated is the portable stand 15 having a plurality of legs 71, 73 which are supported by the wheels 25. Also illustrated are the attachment means 21 which allow for the attachment of the portable stand 15 to the whiteboard 1. As previously referenced, in an exemplary embodiment, the whiteboard 1 may be removably attached to the portable stand 15.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

Thus, specific embodiments and applications of modular overhead storage have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms “comprises” and “comprising” should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C, . . . and N, the text should be interpreted as requiring only one element from the group, not A plus N, or B plus N, etc.

I claim:

1. A device for use with an interactive learning board, the device comprising:

a cover having a first side and a second side whereby the second side is adapted to contact the outside edge of an the interactive learning board and whereby the cover is constructed from a plurality of layers;

a first layer and a second layer which are removably detachable from one another such that a space between the first layer and the second layer may be utilized; and a plurality of sewn elasticized edges on the cover and a plurality of pockets formed by the elasticized edges, said pockets contoured to embrace and envelope the plurality of edges of the interactive learning board wherein the plurality of pockets abuts to the outside edges of the interactive learning board when said device is attached to the interactive learning board.

2. The device described in claim 1 wherein the first side of the cover may be constructed of a material differing from the material of the second side of the cover.

3. The device described in claim 1 wherein the device has a plurality of pockets located on the first side of the cover apparatus.

4. The device described in claim 1 wherein the device has a plurality of pockets adapted to be removably connected to the first side of the cover.

5. The device described in claim 1 wherein said device is constructed of fabric.

6. The device described in claim 1 wherein the device is constructed of any suitable material which may protect the outside edges and front portion of the interactive learning board.

7. The device described in claim 1 wherein the interactive learning board is a whiteboard.

8. The device described in claim 1 wherein the device envelops the corners of the interactive learning board and further wherein the sewn elasticized edges are adapted to wrap around the corners of the learning board and to elastically tighten about the corners.

9. The device described in claim 1 wherein the device is adapted for fitment around a plurality of differently sized interactive learning boards.

10. The device described in claim 1 wherein the device does not utilize handles or straps to secure and protect the interactive learning board from scratches or damage during transport.

* * * * *

UNITED STATES PATENT AND TRADEMARK OFFICE

CERTIFICATE OF CORRECTION

PATENT NO. : 8,931,530 B2
APPLICATION NO. : 13/361784
DATED : January 13, 2015
INVENTOR(S) : Rob Sugarman It is certified that error appears in the above-identified patent and that said Letters Patent is hereby corrected as shown below:

On the Title Page

Item (73) the Assignee name should read “Tequipment, Inc.” not Tequipiment, Inc.

Signed and Sealed this
Twenty-sixth Day of May, 2015

Michelle K. Lee

Michelle K. Lee
*Director of the United States Patent and Trademark Office*